Jan. 7, 1964 L. L. MITCHUM, JR 3,116,895
DISCONNECT COUPLING
Filed Sept. 18, 1962 3 Sheets-Sheet 1

LEONARD L. MITCHUM, JR.,
INVENTOR.

LEONARD L. MITCHUM, JR.,
*INVENTOR.*

Jan. 7, 1964   L. L. MITCHUM, JR   3,116,895
DISCONNECT COUPLING
Filed Sept. 18, 1962   3 Sheets-Sheet 3

LEONARD L. MITCHUM, JR.,
INVENTOR.

United States Patent Office 3,116,895
Patented Jan. 7, 1964

3,116,895
DISCONNECT COUPLING
Leonard L. Mitchum, Jr., 3509 Cayman Road SW.,
Huntsville, Ala.
Filed Sept. 18, 1962, Ser. No. 224,572
8 Claims. (Cl. 244—1)
(Granted under Title 35, U.S. Code (1952), sec. 266)

This invention described herein may be manufactured and used by or for the Government for governmental purposes without the payment of any royalty thereon.

My invention relates to a disconnect coupling for retention of a pair of components in axial engagement and more particularly to a device for coupling a satellite to a rocket for transportation of the satellite to a point in space and release of the satellite at orbital velocity responsive to arrival at the point.

Satellites travel in orbits around primary bodies in space due to attraction between the primary bodies and the satellites. Artificial satellites are put into orbits by transporting the satellite to points in the respective orbits and then applying a force thereto to impart a velocity to the satellite capable of maintaining the satellite in the orbit.

Vehicles and satellites disposed in tandem relationship are launched from the earth and disposed for transportation to a point in space for orbiting of the satellite at predetermined orbital velocities. The vehicles are usually cylindrical in configuration and include propulsion mechanisms for the transportation of the satellite to the predetermined point in space and the satellites are separated from the vehicles upon arrival at the point. At separation, the satellite is disposed for application thereto of a force to impart orbital velocity to the satellite corresponding to the point in orbit.

It is, therefore, an object of my invention to provide a device for securing a pair of components in axial engagement and release of one of the components responsive to an electric signal.

Another object of my invention is to provide such a device disposed to apply a force between the components for separation thereof responsive to the release.

An additional object of my invention is to provide such a device disposed to apply a value of the separation force between a vehicle and a satellite for independent orbital progress of the satellite.

In carrying out my invention, apparatus including a satellite and a vehicle therefor, secured together in axial engagement by a disconnect coupling, are disposed for conveyance of the satellite to a point in space and for application to the satellite of forces for orbiting the satellite about a major space body. The apparatus is disposed to provide an electric signal at the space point for release of the satellite responsive to the electric signal.

The device includes an internal support member secured to the vehicle and to the main body carried by the satellite. The internal support is provided with radially constructed hemispherical members disposed in circumferential engagement with the main body. A thrust cone carried in the internal support is disposed for locking the hemispherical members in engagement with the main body and for release of the members at the desired time. An electric gear reduction motor carried by the satellite is provided with a threaded shaft which is threadably disposed in the thrust cone.

An electric signal is provided for actuation of the gear reduction motor at the predetermined point in space. The thrust cone is disposed for axial movement responsive to the rotation of the threaded shaft therein. The axial movement of the thrust cone permits unseating of the hemispherical members for the separation and a spring carried between the main body and the internal support, exerts a force on the main body for independent orbital progress of the satellite responsive to the unseating.

Other objects and advantages of my invention will be more readily apparent from the following detailed description, taken in conjunction with the following drawings, in which.

Figure 1:
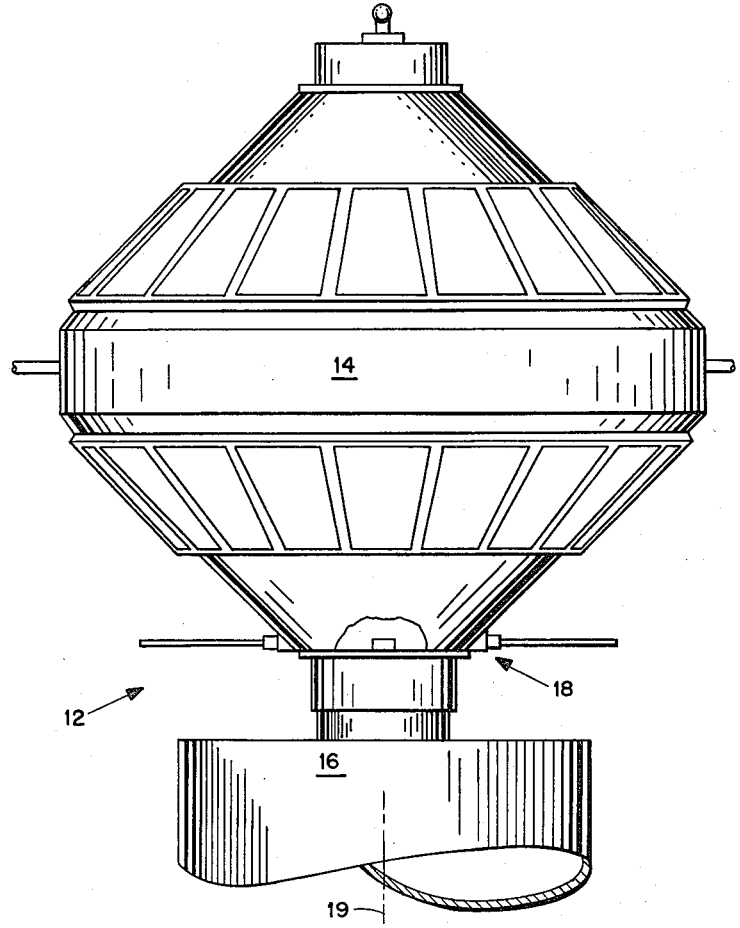
FIGURE 1 is an elevational view of the apparatus including a vehicle and a satellite secured thereto by the disconnect coupling of my invention.

Accordingly, an apparatus 12 includes components such as a satellite 14 and a vehicle 16, such as a rocket. The apparatus is provided with a separation device or disconnect coupling 18 for retention of the components in alignment with respect to axis 19, and vehicle 16 is disposed for transportation of satellite 14 to a point in space. Coupling 18 is disposed for release of satellite 14 upon arrival at the point in space of the apparatus. Coupling 18 is further disposed for application of a force to the satellite to impart independent orbital velocity thereto for orbiting the satellite responsive to the release.

Figure 2:
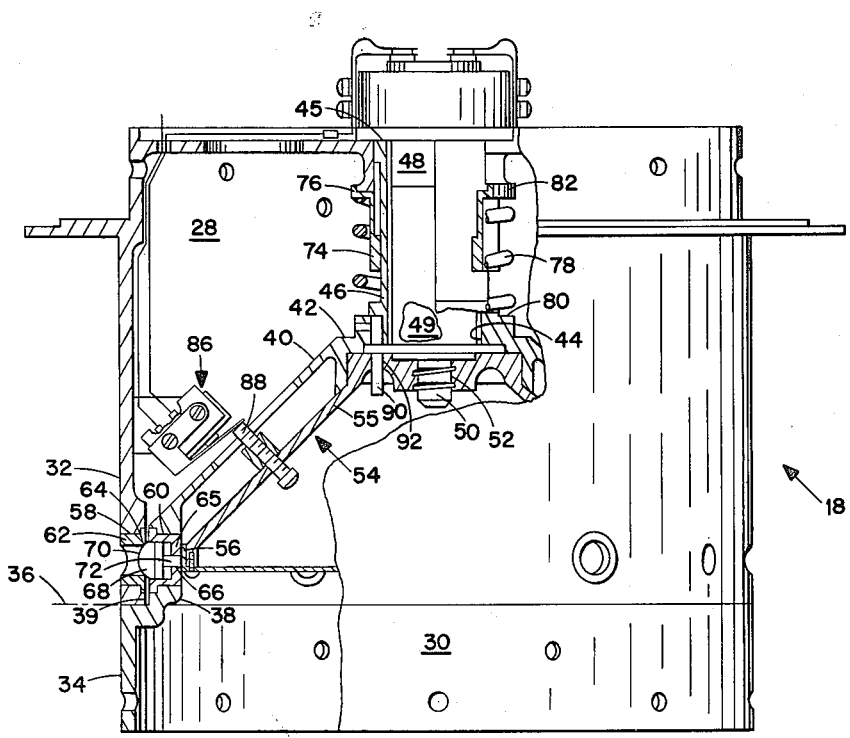
FIGURE 2 is an elevational view, partially in section, of the disconnect coupling in its assembled position.
Figure 3:
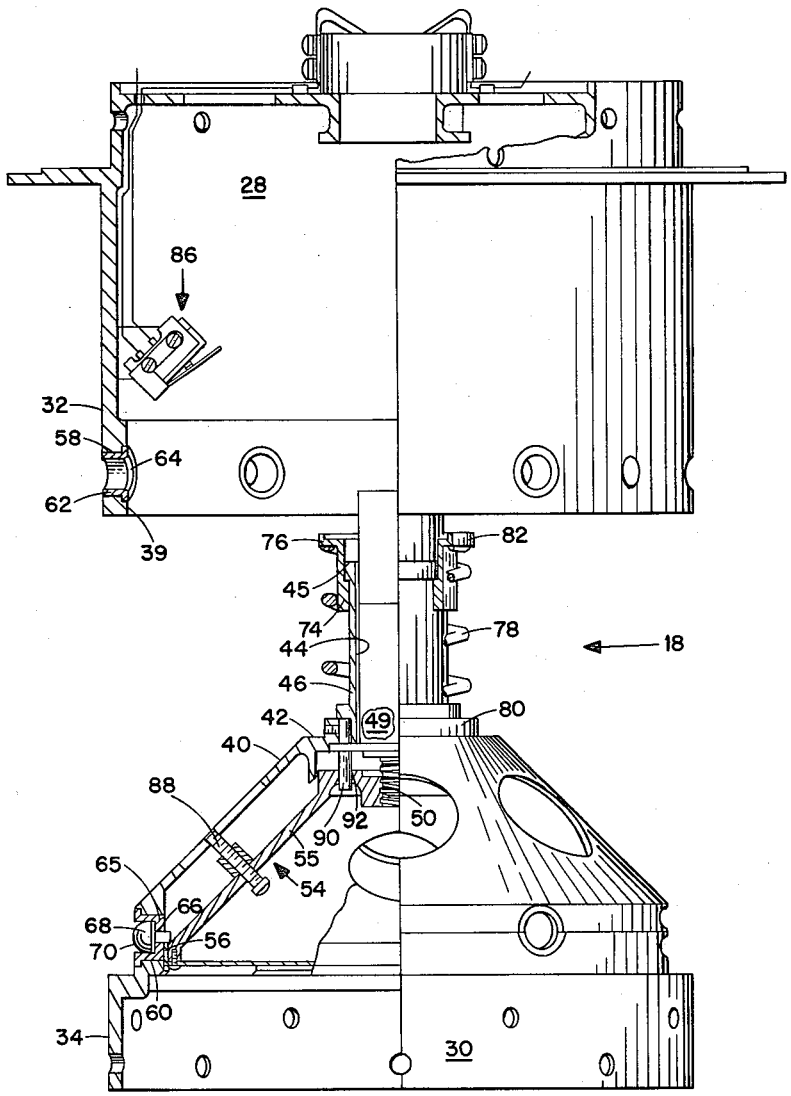
FIGURE 3 is an elevational view, partially in section, of the disconnect coupling in its separated position.

Coupling 18 includes a pair of members 28 and 30 having respective portions 32 and 34 of equal diameter. Members 28 and 30 are respectively attached to satellite 14 and vehicle 16 and are disposed for engagement along a transverse plane 36 as indicated in FIGURE 2.

Member 30 includes an intermediate cylindrical portion 38 for axial engagement with the inner surface 39 of portion 28 and a conical portion 40 having a transverse surface 42 and an axial bore 44. A sleeve like portion 46 of member 30 projects upward from surface 42 to enclose an electric motor 48. A gear train (not shown) is mounted in a portion 49 of sleeve 46.

A shaft 50 connected to motor 48, through the gear train, extends downward in sleeve 46, through bore 44, and is disposed in threaded engagement with an upper transverse surface 52 of a thrust cone member 54. Member 54 is slidably mounted in member 30 and includes a conical portion 55 secured to a lower cylindrical portion 56.

Portions 32 and 38 are provided with a plurality of correspondingly spaced radial holes, respectively designated as 58 and 60. Holes 58 of portion 32 are each provided with a bushing 62 having a conically ground seat 64. Holes 60 are each provided with a bushing 65 having a central aperture 66 therethrough.

A plurality of locking members 68 are positioned in bushings 62 and 65 to retain members 28 and 30 in coupled relationship. Members 68 are each provided with a hemispherical portion 70 disposed in conical seat 64 of bushing 62 and a rod end 72 slidably protruding into aperture 66 of bushing 64 and in abutting relationship with cylindrical portion 56 of member 54. Members 68 are thus wedged between members 28 and 30 for retention thereof in locked position.

The upper end 45 of sleeve 46 is provided with a sleeve 74 including a flange 76 mounted for slidable movement on sleeve 46. A spring 78 is mounted about sleeve 46 for engagement between a shoulder 80 of sleeve 46 and flange 76. An annular surface 82 of member 28 engages flange 76.

Figure 4:
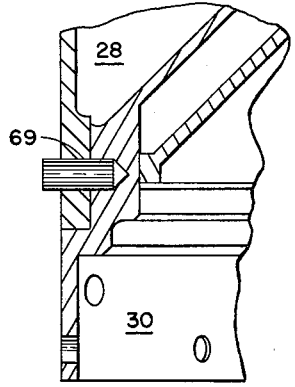
FIGURE 4 is a fragmentary sectional view taken along a plane intermediate the radial apertures of the members and illustrating the locating pins for the assembly of the coupling.

To assemble the coupling, members 28 and 30 are placed in position and locking members 68 are aligned with seats 64. Electric motor 48 is actuated in reverse rotation to turn shaft 50 in threaded engagement with surface 52 of thrust cone 54, thus drawing members 28 and 30 into engagement. Locking pins are placed in apertures 69 (FIG. 4) for retention of members 28 and 30 until the device is assembled.

A limit switch 86 mounted on member 28 is disposed for coaction with a screw member 88 carried by thrust cone 54 to break the motor circuit and stop rotation of screw 50 when the members 28 and 30 are in proper position.

OPERATION

When satellite 14 and vehicle 16 have reached the predetermined point in space, motor 48 is actuated by electronic mechanisms carried in either the satellite or vehicle. Actuation of the motor turns the output shaft 50 in a counter-clockwise direction (viewed from the output end). This rotation of shaft 50 forces thrust cone 54 to move laterally. (Rotational movement of cone 54 is prevented by pins 90 disposed in surface 42 of member 40 and in sliding fit in an aperture 92 of surface 52 of cone 54.) As the thrust cone moves laterally, portion 56 moves past the point of interference with the rod ends 72 of locking members 68 to decouple the systems. Spring 78 expands to provide a movement of sleeve 74 and this exerts a separation force between the satellite and vehicle for independent orbital progress of the satellite.

The time interval between applying the current to the motor and separation is very flexible. This interval can be changed by changing either the applied voltage, travel distance, pitch of threaded shaft or the reduction motor ratio. The gear reduction motor is completely reversible by only reversing the polarity of the applied voltage.

The motor is actuated by a signal received from electronic components carried in the satellite. These components are disposed to transmit the signal at a predetermined time for actuation of the motor and thereby effect complete separation of the satellite from the vehicle.

It is to be understood that the foregoing description of my invention is to be taken as illustrative of the general principles involved and, therefore, is not to be taken in a limiting sense, since many apparent modifications of my invention may be resorted to that are within the spirit and scope of the appended claims.

I claim:

1. An apparatus comprising a pair of components disposed for axial engagement and a device for releasably securing said components in the engagement comprising:
   (a) Members carried by each of said components and respectively provided with a plurality of correspondingly spaced radial apertures;
   (b) A plurality of locking elements respectively disposed in said apertures for retention of said members in the engagement;
   (c) An actuator carried by said apparatus and including a mechanism provided with a cylindrical portion disposed for abutting relationship with each of said locking elements for retention thereof in said apertures and for displacement for release of said locking elements for separation of said components responsive to actuation of said actuator; and
   (d) Resilient means secured between said members in biased relationship therewith and disposed for application of a force between said members for relative displacement of said components, responsive to the release.

2. Apparatus as in claim 1 with said components including a vehicle and a satellite disposed for travel to a point in space and for the separation at the space point.

3. Apparatus as in claim 2 with said actuator including an electric motor and a source of electrical energy connected thereto, for the operation responsive to arrival of said apparatus at said space point.

4. Apparatus including a vehicle and a satellite disposed in axial engagement for travel to a point in space and a device for releasably securing said satellite to said vehicle, said device comprising:
   (a) members carried by said vehicle and satellite and provided with respective pluralities of correspondingly spaced apertures;
   (b) a plurality of locking elements respectively provided in said apertures and disposed for releasably securing said members in engagement;
   (c) an electric motor carried by said apparatus and disposed for operation at said point in space;
   (d) a thrust member slidably mounted in said vehicle carried member and provided with an upper transverse surface having an axial opening therein and a lower cylindrical portion disposed in abutting relation with said locking elements for retention of said members in secured relation;
   (e) a shaft connected to said motor and disposed in threaded relation with said axial opening for rotation therein and downward movement of said thrust member for release of said locking elements and separation of said members responsive to actuation of said motor;
   (f) resilient means secured between said members and disposed for application of a force between said members, for relative displacement of said vehicle and satellite responsive to the release.

5. Apparatus as in claim 4 with said locking elements provided with a hemispherical end and a rod end.

6. Apparatus as in claim 5 with a bushing provided in each of said apertures of said members:
   (a) said bushings of said satellite carried member having a conical ground seat;
   (b) said bushings of said vehicle carried member having a central aperture therein;
   (c) said locking elements disposed in said bushings with said hemispherical end seated in said conical ground seat of said bushings of said satellite carried member, said rod end of said locking elements disposed in said bushings of said vehicle carried member and protruding through said apertures of said bushings in abutting relation with said thrust member for retention of said members in secured relation.

7. Apparatus as in claim 5 with said vehicle carried member including:
   (a) a lower cylindrical portion disposed for attachment to said vehicle;
   (b) an intermediate recessed cylindrical member disposed upwardly of said lower cylindrical portion including said apertures for receiving said bushings therein;
   (c) a conical portion extending upwardly of said intermediate portion and provided with an upper transverse surface, said conical portion disposed for retaining said thrust member slidably therein;
   (d) a sleeve-like portion extending upward from said transverse surface and disposed for enclosing said motor and said shaft; and
   (e) a flanged member slidably disposed on the upper end of said sleeve-like portion, said flange disposed for supporting said satellite carried member therein.

8. Apparatus as in claim 7 with said resilient means comprising:

(a) a spring mounted about said sleeve-like portion of said vehicle carried member and having one of its ends seated against said transverse surface of said conical portion and the other end of said spring disposed in engagement with said flange, said spring disposed to exert a separation force between said vehicle carried member and said satellite carried member responsive to release of said locking elements.

References Cited in the file of this patent

UNITED STATES PATENTS

| | | |
|---|---|---|
| 2,779,283 | Baughman | Jan. 29, 1957 |
| 2,959,129 | Warren | Nov. 8, 1960 |